United States Patent [19]
Walker

[11] Patent Number: 5,667,305
[45] Date of Patent: Sep. 16, 1997

[54] LOW FORCE HIGH PRESSURE PORT

[75] Inventor: James Thomas Walker, Plymouth, Mich.

[73] Assignee: Ford Motor Company, Dearborn, Mich.

[21] Appl. No.: 488,526

[22] Filed: Jun. 9, 1995

[51] Int. Cl.[6] .............................. G01K 1/08; G01K 1/14; G01K 13/00
[52] U.S. Cl. ................................ 374/148; 374/208
[58] Field of Search .......................... 374/141, 147, 374/148, 208

[56] References Cited

U.S. PATENT DOCUMENTS

| 752,452 | 2/1904 | Hohmann | 374/208 |
|---|---|---|---|
| 1,233,385 | 7/1917 | Maurer | 374/208 |
| 1,612,596 | 12/1926 | McFarland | 374/208 |
| 1,675,210 | 6/1928 | Campbell et al. | 374/208 |
| 1,875,889 | 9/1932 | Rose | 374/208 |
| 3,897,272 | 7/1975 | Medlar | 374/208 |
| 4,327,586 | 5/1982 | Goddard | 374/148 |
| 4,641,012 | 2/1987 | Roberts | 374/148 |
| 4,772,132 | 9/1988 | Hofmann | 374/148 |
| 4,773,767 | 9/1988 | Coll | 374/147 |

FOREIGN PATENT DOCUMENTS

| 52-369 | 5/1982 | European Pat. Off. | 374/208 |

*Primary Examiner*—G. Bradley Bennett
*Attorney, Agent, or Firm*—Peter Abolins

[57] ABSTRACT

A port having an advantageously small cross section portion for passing a sensor to a high pressure region and an adjacent relatively larger cross section threaded portion for coupling to the sensor. A sealing member being positioned adjacent the small cross section portion thereby reducing the force applied to the threaded portion.

4 Claims, 1 Drawing Sheet

LOW FORCE HIGH PRESSURE PORT

BACKGROUND OF THE INVENTION

1. Field of the Invention

This invention relates to threaded couplings across a pressure differential.

2. Prior Art

It is known to have a threaded plug with a sealing member at a relatively wide portion of the threaded plug and positioned at a low pressure end of a port connecting a low pressure region and a high pressure region into which the threaded plug is inserted. It would be desirable to use both a smaller cross section port with a smaller cross section seal and to have a threaded region capable of withstanding a higher pressure. These are some of the problems this invention overcomes.

SUMMARY OF THE INVENTION

In order to mount a plug such as a natural gas vehicle gas temperature sensor through a wall of a tube carrying gas, a port is formed in the wall. At least a portion of the port is threaded so that a threaded portion of the plug can be engaged and the plug inserted into the port. In order to get a lower force coupling between the plug and the port, a narrow portion is formed in the port for passing a sensing portion of the plug. The threaded portion of the plug, outward of the narrow portion, has an enlarged threaded cross section to accommodate the sensor housing and reduce the force on the threads. A seal is positioned at the narrow portion of the port. Since force is proportional to cross sectional area, the narrow portion reduces the amount of force applied to the plug. Further, the cross section to be sealed is made independent in size of the cross section to be threaded. Thus the threaded cross section can be advantageously large and the sealing cross section can be advantageously small to reduce the force applied to the plug. This permits operation at higher pressure with lower forces applied to the threaded region. Thus lower strength, which can be lower cost, materials can be used.

DETAILED DESCRIPTION OF THE DISCLOSURE

Figure 1:
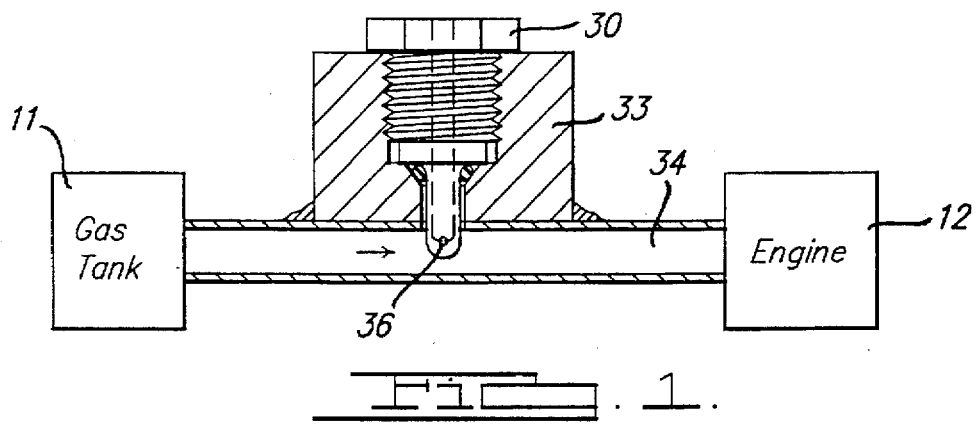
FIG. 1. is a cross sectional view of a threaded plug in a port of a tube between a gas tank and an engine in accordance with an embodiment of this invention.

Referring to FIG. 1, a gas flow path 34 connects a gas tank 11 and an engine 12. Mounted on gas flow path 34 is a boss 33, which is a stainless steel block and serves to mount a plug 30. Plug 30 contains a sensor 36 which gathers information about gas flow path 34.

Figure 2:
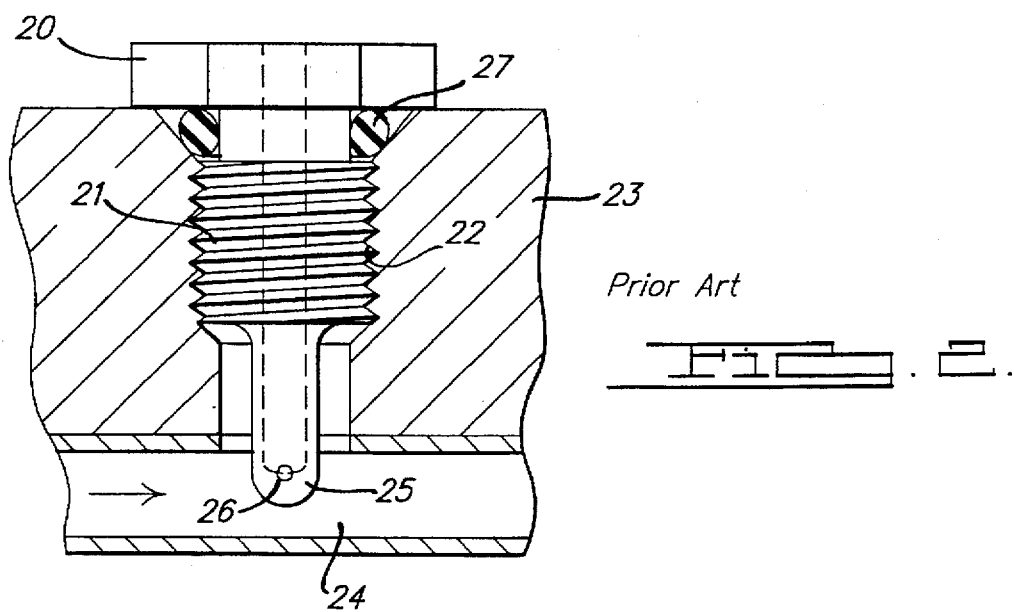
FIG. 2. is a cross sectional view of a port with a threaded plug and seal in accordance with the prior art.

Referring to FIG. 2, a prior art port and sensor assembly has a plug 20 with a threaded portion 21 engaging a threaded portion 22 of an opening in a boss 23 which couples to a gas flow path 24. Plug 20 has a tip 25, which contains a sensor 26 and is inserted into gas flow path 24. An O-ring 27 is positioned adjacent to threaded portion 21 and on the opposite side from gas flow path 24. Such construction provides sealing at the maximum diameter of the opening in boss 23 so that the size of the sealed cross sectional area is about equal to the size of the cross sectional area of threaded portion 22.

Figure 3:
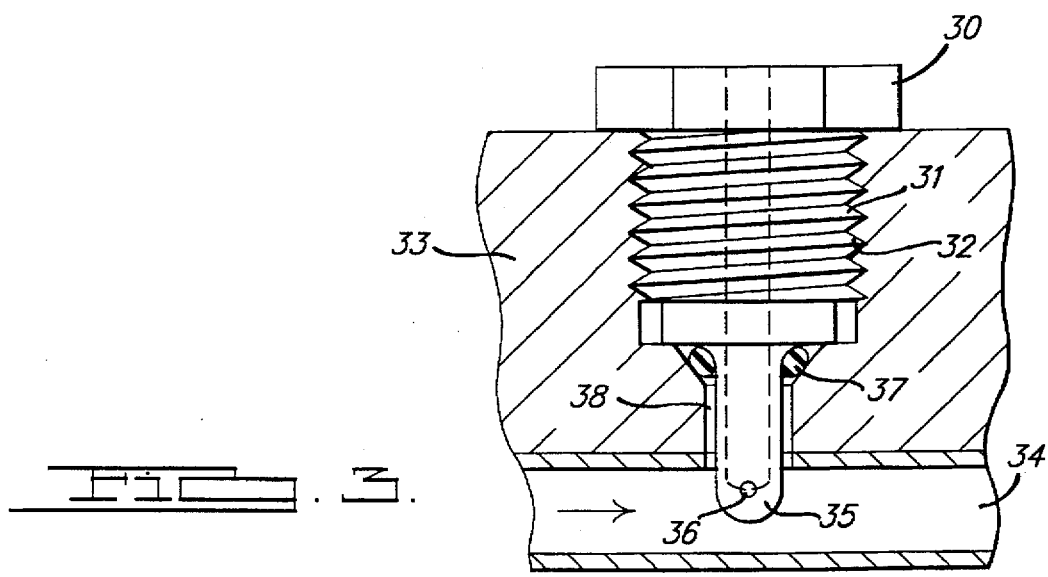
FIG. 3 is an enlarged cross sectional view of FIG. 1 of a threaded plug in a port with the threaded portion and seal positioned in accordance with an embodiment of this invention.

Referring to FIG. 3, a plug and opening combination for a sensor assembly has plug 30 with a threaded portion 31 engaging a threaded portion 32 of an opening in boss 33 which couples to gas flow path 34. Plug 30 has a tip 35 which contains sensor 36. Sensor 36 is inserted into gas flow path 34. An O-ring 37 is positioned adjacent to threaded portion 31 on the gas flow side of plug 30.

In accordance with the design of FIG. 3, the threaded coupling between threaded portions 31 and 32 has a larger diameter and thus produces a stronger coupling than the coupling between threaded portions 21 and 22 of the prior art construction shown in FIG. 2. A further advantage is that the threaded coupling between threaded portions 31 and 32 has to withstand lower forces because of the smaller size of a sealed opening 38 of FIG. 3.

A working pressure is the pressure at which the gas tank is filled. This pressure for the sensor assembly is generally 3600 psi. In accordance with this design, the working force on the smaller O-ring 37 is much smaller at for example, 177 pounds versus the 541 pounds on the larger O-ring 27. Similarly, a burst pressure, which may be a safety factor of four times the working force [3600 psi×4=14,400 psi]. Thus the burst force on the smaller O-ring 37 is at 707 lbs. versus a burst force of 2,165 lbs. on larger O-ring 27.

Various modifications and variations will no doubt occur to those skilled in the arts to which this invention pertains. Such variations which basically rely on the teachings through which this disclosure has advanced the art are properly considered within the scope of this invention.

I claim:

1. A combination of a plug and an opening for receiving said plug, said opening extending through a wall between a first region at a first pressure and a second region at a second pressure, said second pressure being less than said first pressure and the magnitude of said first and second pressures being substantially different;

said opening having a smaller cross sectional area adjacent said first region than said second region, and a larger cross sectional area adjacent said second region than said first region;

said plug having a smaller cross sectional area adjacent said first region than said second region, and a larger cross sectional area adjacent said second region than said first region;

said larger cross sectional area of said plug and said opening being configured for threaded engagement; and a single sealing means adjacent said smaller cross sectional area of said plug and said opening, so that said sealing means is positioned on said first region side of said threaded engagement between said plug and said opening and there is an advantageously larger thread diameter holding a smaller sealing diameter port.

2. A combination as recited in claim 1 wherein said sealing means is an O-ring positioned between said smaller cross sectional area of said opening and said smaller cross sectional area of said plug.

3. A combination as recited in claim 2 wherein said plug includes a sensing means, for sensing a physical parameter of said first region, in said smaller cross sectional area of said plug adjacent said first region.

4. A combination as recited in claim 3 wherein said plug includes a temperature sensor and said opening is formed in a wall of a tube carrying natural gas between a natural gas storage tank and a natural gas engine.

* * * * *